US009738550B2

(12) United States Patent
Perez Monsrreal

(10) Patent No.: US 9,738,550 B2
(45) Date of Patent: Aug. 22, 2017

(54) BIO-FILTER FOR WASTE WATER DIGESTION

(76) Inventor: Jose Rogelio Perez Monsrreal, Merida (MX)

( * ) Notice: Subject to any disclaimer, the term of this patent is extended or adjusted under 35 U.S.C. 154(b) by 855 days.

(21) Appl. No.: 14/117,609

(22) PCT Filed: May 11, 2012

(86) PCT No.: PCT/MX2012/000052
§ 371 (c)(1),
(2), (4) Date: Aug. 11, 2014

(87) PCT Pub. No.: WO2012/158011
PCT Pub. Date: Nov. 22, 2012

(65) Prior Publication Data
US 2015/0001145 A1    Jan. 1, 2015

(30) Foreign Application Priority Data
May 13, 2011    (MX) .................... MX/a/2011/005083

(51) Int. Cl.
*B01D 33/70* (2006.01)
*C02F 3/00* (2006.01)
(Continued)

(52) U.S. Cl.
CPC ........ *C02F 3/2826* (2013.01); *B01D 21/0051* (2013.01); *B01D 21/0069* (2013.01);
(Continued)

(58) Field of Classification Search
CPC ............ B01D 21/2427; B01D 21/0051; B01D 21/0069; B01D 21/0039; B01D 21/24;
(Continued)

(56) References Cited

U.S. PATENT DOCUMENTS 2,514,366 A    9/1945   Beyland et al.
4,918,426 A    4/1990   Butts et al.
(Continued)

FOREIGN PATENT DOCUMENTS

CN    2356028       12/1999
DE    19914674 C1   12/2000
(Continued)

OTHER PUBLICATIONS

English Translation of International Search Report of International Application No. PCT/MX2012/000052, dated Dec. 10, 2012.
(Continued)

*Primary Examiner* — Nam Nguyen
*Assistant Examiner* — Julia Wun
(74) *Attorney, Agent, or Firm* — Polsinelli PC

(57) ABSTRACT

The present disclosure relates to a biofilter for wastewater digestion, in which a high degree of contaminant removal is obtained with a single device. In order for these levels to be achieved, the following are essential: the shape of the biofilter, the supply/discharge ratio of the biofilter, the position and height of each of the components and, finally, the combination of two packed zones, namely: a random zone, and a zone arranged in the form of ringed or corrugated tube bundles.

5 Claims, 6 Drawing Sheets

(51) Int. Cl.

| | | |
|---|---|---|
| *C02F 3/28* | (2006.01) | |
| *C02F 3/12* | (2006.01) | |
| *C02F 3/10* | (2006.01) | |
| *B01D 21/00* | (2006.01) | |
| *B01D 21/24* | (2006.01) | |
| *C02F 1/32* | (2006.01) | |
| *C02F 1/76* | (2006.01) | |
| *C02F 3/02* | (2006.01) | |
| *C02F 103/20* | (2006.01) | |

(52) U.S. Cl.
CPC ............ *B01D 21/2427* (2013.01); *C02F 3/10* (2013.01); *C02F 3/101* (2013.01); *C02F 3/12* (2013.01); *C02F 3/2806* (2013.01); *C02F 3/2866* (2013.01); *C02F 1/32* (2013.01); *C02F 1/76* (2013.01); *C02F 3/02* (2013.01); *C02F 2103/20* (2013.01); *C02F 2203/006* (2013.01); *Y02W 10/15* (2015.05)

(58) Field of Classification Search
CPC .... B01D 21/0024; B01D 21/02; B01D 21/00; C02F 3/2826; C02F 3/101; C02F 3/2806; C02F 3/02; C02F 3/10; C02F 3/12; C02F 3/2866; C02F 1/32; C02F 1/76; C02F 1/52; C02F 2103/20; C02F 2203/006; Y02W 10/15; Y02W 10/10; Y02W 10/20; Y02W 10/27
USPC ....... 210/150, 601, 615, 616, 617, 620, 285, 210/130
See application file for complete search history.

(56) References Cited

U.S. PATENT DOCUMENTS

| | | | |
|---|---|---|---|
| 5,227,061 A | 7/1993 | Bedsole | |
| 5,573,671 A | 11/1996 | Klein | |
| 5,705,057 A * | 1/1998 | Hoffa | A01K 63/045 119/260 |
| 6,475,381 B1 * | 11/2002 | Gustafsson | B01D 21/0003 210/151 |
| 6,531,058 B1 * | 3/2003 | Josse | C02F 3/2833 210/151 |
| 6,682,654 B1 * | 1/2004 | Telchuk | B01D 17/0208 210/122 |
| 7,297,274 B2 * | 11/2007 | Wilkie | C02F 3/101 210/259 |
| 7,485,228 B2 | 2/2009 | Herding et al. | |

FOREIGN PATENT DOCUMENTS

| | | | | |
|---|---|---|---|---|
| DE | 102005027509 A1 | 12/2006 | | |
| EP | 0300910 A1 | 1/1989 | | |
| EP | 0356870 | 3/1990 | | |
| EP | 0514543 A1 | 11/1992 | | |
| EP | 0965375 A1 | 12/1999 | | |
| FR | 2565223 | 12/1985 | | |
| GB | 988584 A | 4/1965 | | |
| GB | 1457468 A | 12/1976 | | |
| GB | 2374297 A | 10/2002 | | |
| JP | 11333210 | 12/1999 | | |
| JP | 2009172458 A | 8/2009 | | |
| MX | WO 2006091064 A1 * | 8/2006 | ......... | B01D 21/0012 |
| WO | WO 2005/042418 | 5/2005 | | |
| WO | 2006091064 A1 | 8/2006 | | |
| WO | 2010093232 A1 | 8/2010 | | |
| WO | 2012158011 A2 | 11/2012 | | |

OTHER PUBLICATIONS

English Abstract for DE19914674 published Dec. 28, 2000; downloaded Nov. 11, 2013.
English Abstract for DE102005027509 published Dec. 28, 2006; downloaded Nov. 11, 2013.
English Abstract for EP0300910 published Jan. 25, 1989; downloaded Nov. 11, 2013.
English Abstract for EP0965375 published Dec. 22, 1999; downloaded Nov. 11, 2013.
English Abstract for JP 11333210 published Dec. 7, 1999; downloaded Nov. 11, 2013.
English Abstract for JP2009172458 published Aug. 6, 2009; downloaded Nov. 12, 2013.
English Translation of Written Opinion of the International Searching Authority of International Application No. PCT/MX2012/000052 dated Dec. 10, 2012, downloaded on Nov. 13, 2013.
Spanish version of Written Opinion of the International Searching Authority of International Application No. PCT/MX2012/000052 dated Dec. 10, 2012, downloaded on Nov. 13, 2013.
Spanish version of of International Search Report of International Application No. PCT/MX2012/000052, dated Dec. 10, 2012.
Supplementary European Search Report for EP Application No. 12784958.6 dated Oct. 10, 2014, 7 pages.
Office Action for Canadian Application No. 2,835,304 dated Mar. 17, 2015, 4 pages.

* cited by examiner

BIO-FILTER FOR WASTE WATER DIGESTION

CROSS-REFERENCE TO RELATED APPLICATIONS

This application is a national stage entry of PCT/MX2012/000052 filed May 11, 2012, which claims priority to MX/a/2011/005083, which was filed on May 13, 2011, said applications are expressly incorporated herein in their entirety.

TECHNICAL FIELD OF THE INVENTION

The present invention relates to the treatment of both domestic organic waste water, which comes from dwellings, and liquid organic waste from livestock farms in urban and rural zones.

BACKGROUND OF THE INVENTION

The treatment of waste water is a problem which occurs mainly in suburban and rural zones where there may or may not exist a municipal drainage system to collect the waste water coming from dwellings and offices; it is then not properly treated in a waste water treatment plant, resulting in the untreated water being poured directly into an aquifer.

A variety of applications have been developed to solve this problem, one being the septic tank. A septic tank has the advantage of taking up little space as well as internally containing the elements which treat the waste water in a short time, without requiring external energy, and without exerting a rigid control over the processes, thus being highly individual systems.

Most of the waste water treatment plants use electromechanical equipment and are aerobic. They require high operation and maintenance. Because of this, even though their acquisition cost is relatively low and they use little space while extracting much sludge, they are more appropriate for more urbanized areas since their operational and control complexity cause them to be operative failures in suburban or rural zones.

Due to these kinds of problems, a type of equipment with low operation was designed which guarantees, even in the worst cases, an intermediate level of treatment. It also has the advantage of absorbing the peaks of the influent because it implements a better anaerobic process and has a greater retention time. It also has the possibility of obtaining bio-gas and a low production of sludge which can be used utilized afterwards.

In Mexico, one of the products currently available on the market is a septic tank which consists of a tank made of a plastic material. It has a filter fixed to the lid of the tank on the inside. It also has a feeding pipe and a discharge tube which comes out of the filter in such a way that the water comes into the tank, goes through the filter and overflows through the discharge tube once it has reached a certain height, attempting to imitate my patent No PA/a/1998/010893.

One of the closest prior designs is in the application for international patent WO02006/091064 which I created where the septic tank is a body formed by three sections, where the central part has a cylindrical section, the lower section has the form of a frustum pointing downwards and the upper section is also a frustum which has some triangular shaped projections whose hypotenuses are adjacent to the wall of the tank. These projections are placed in opposite directions making them rectangular in shape at the top. The sides of the triangle are perpendicular and the upper side of the triangle is horizontal.

In this invention, the feeding is done laterally through a horizontal tube which reaches the central part of the tank or septic pit. A duct connected perpendicularly to the end of this tube reaches the lower part of the tank without touching its bottom. (This is done in order to put the new water in contact with the anaerobic microorganisms which are part of the process)

This invention also has a duct which lets out the treated effluent. The diameter of this duct is smaller than the diameter of the feeding tube and this duct is placed at a lower height than the feeding tube. In the central part of the tank there is a cylindrically shaped filter which is placed in the center and in the lower part of the lid of the tank; the filter has filtering material up to the same height as the output tube of the effluent; the filter is crossed by feeding ducts and output ducts on its walls.

Additionally, the tank has a duct which extends from the upper part of the tank to the lower part without touching the bottom of the tank. This tube is placed in an inclined position in such a way that it practically reaches the bottom of the conical section without touching the bottom, and in the upper part it connects to a sludge discharge pipeline which has a horizontal shunt and which is located at a lower height than the output of the treated effluent and of the feeding input.

The advantages of this invention can be summarized as follows: it is a waterproof self-cleaning tank which does not require sludge extraction equipment although its design includes a duct which would allow this operation in case the self-cleaning tube was to become obstructed.

The patent application I wrote, publication WO2010/093232, relates to a septic tank with a self-cleaning filter and retro-feeding device and further includes a decanter and a skimmer.

The U.S. Pat. No. 5,227,061 by Robert D. Bedsole pertains to an apparatus which separates pollutants from fuel, with a cylindrical structure in its upper part and conical body in its lower part. The equipment has a curved feeding nozzle placed in the periphery of the pollutant separator which produces a centrifugal effect similar to that produced in centrifugal separators. The lower part of the separator is a water and solids collector which traps them in the filter where they accumulate and fall to the bottom section of the collector; meanwhile, since they are lighter, the fuel particles remain suspended and flow upwards through the center of the fuel/pollutants separator. However, this invention as it has been described above is not linked to the present invention because, to begin with, it is not self-cleaning and it requires high pressure in order to function.

The German patent application DE-102005027509 relates to a filter for a mixture of suspended solids. This invention has a container which rotates on a central axis, and has a tangential input. The suspension entering the container is thus subjected to both tangential and axial forces. A secondary vortex is formed in the center with the same tangential direction but with opposite axial component. The container is comprised of a filter assembly with a number of filtering elements placed in the barrier between the primary and secondary vortexes, facilitating the interaction among them. This separator requires a rotary movement, energy and a motor that powers the rotational movement. Therefore, it is not a static separator, which the separator of the present invention is.

The U.S. Pat. No. 4,918,426 comprises a water purification system which consists of an outer container, an input duct and an output duct. It also refers to the existence of a filtering element, but it never states that the system is self-cleaning or that it has a system to extract the separate solids; therefore, this invention also does not directly relate to the present invention.

The German application patent DE 19914674 refers to filtering equipment which requires a rotational movement to obtain filtration; hence, it does not solve the problem of finding equipment which can be used in rural communities as it requires high costs for energy and maintenance.

Although the document EP0300910 refers to filtration equipment, it is oriented to a liquid-gas separation and not a liquid-solids separation. This invention has a sedimentation tank which contains a filtering cartridge and a firmly attached outer casing which has an input and an output for the fuel. It is worth noting that this invention does not have any way to remove solids, as this is not its objective. Therefore it cannot be considered a state-of-the art separator even though it serves the purpose of fluids separation.

The U.S. Pat. No. 2,514,366 pertains to a filter which has similar elements to those mentioned in the present invention but it fails to be self-cleaning and needs to have the screw at the bottom of the tank removed in order to drain the sediments. Installation, therefore, must be at a certain height above the ground, or adding an access channel to clean the sludge would be required.

The patent application GB 2374297 comprises a sedimentation system where the sedimentation tank is specifically placed among a set of elements and which has a feeding tube that inputs the liquid tangentially. The tank has a tube at the bottom to drain the sediments as well as a tube to separate clear water. This system, in addition to being complex due to its large number of interconnected elements, also fails to solve the problem of having a self-cleaning septic tank, as its tank is drained by gravity. A gravity draining system implies that the tank has to be in an elevated position; whereas the tank of the present invention is designed to be buried which will enable it to drain solids through its upper part.

The European patent EP-0965375 refers to a tank which separates solids from a solids-liquids mixture. It is important to note that this invention requires the liquid to be pumped from the bottom of the tank, which means it does not allow the liquids to come out by the simple process of being at different levels, as does the present invention. It is important to point out that the flat bottom design of the tank does not guarantee an adequate collection of the solids to the drain, and that the spiral, even when it helps the solids collect, constitutes a barrier which permits the flow of the solids only if they have enough speed to be dragged to the drain.

The document ES-2089185 T3 relates to a tank to purify waste water, but even with a cylindrical body and a conical bottom, it, too, fails to solve the self-cleaning problem, and would therefore require the installation of a drainage tube and valves at the bottom of the tank for drainage purposes.

The Japanese patent JP-11333210 is a sedimentation tank which has an inner body to separate sludge. The water comes in through a tube which takes the water to the center of the tank and to the center of the sludge separation body which has the shape of an inverted cone positioned to oppose the conical shape of the bottom of the separation tank, thus creating a narrow slot in the periphery of the tank through which only the clarified water can pass while the debris gets trapped inside the conical body. This invention has an internal peripheral channel in the upper part, where the clarified water is collected and extracted by a pipeline.

Again, the difference with this invention is that it not only is not a self-cleaning filter, it does not have a filter at all. In this invention, the level of the sludge will increase gradually ultimately requiring its extraction by mechanical means.

As the aforementioned information shows, there does not currently exist a piece of commercial equipment incorporated into one body which can carry out all the functions of solids-liquid separation, filtering and bio-digestion, and filtering and solids drainage without requiring any kind of support from mechanical means.

Figure 1:
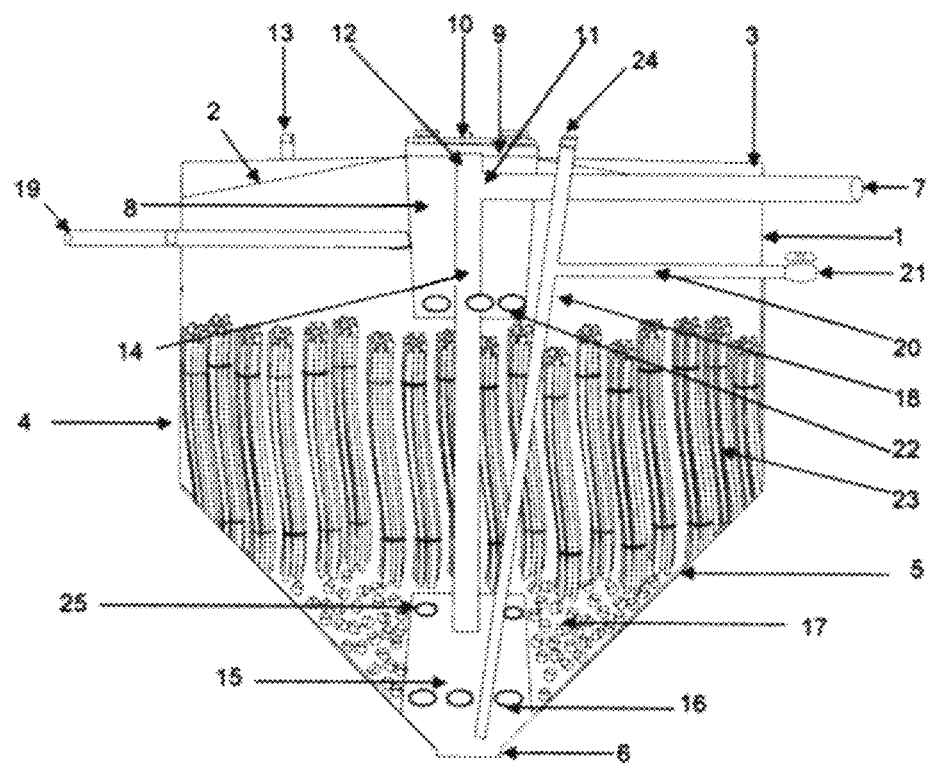
FIG. 1 is a diagram of the bio-filter for the digestion of waste water.
Figure 2:
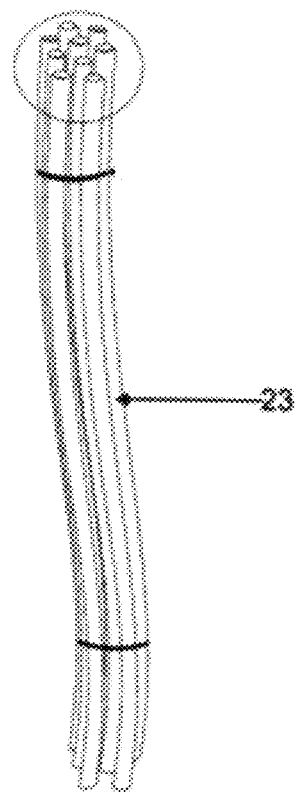
FIG. 2 is a bundle of tubes utilized as contact material.
Figure 3:
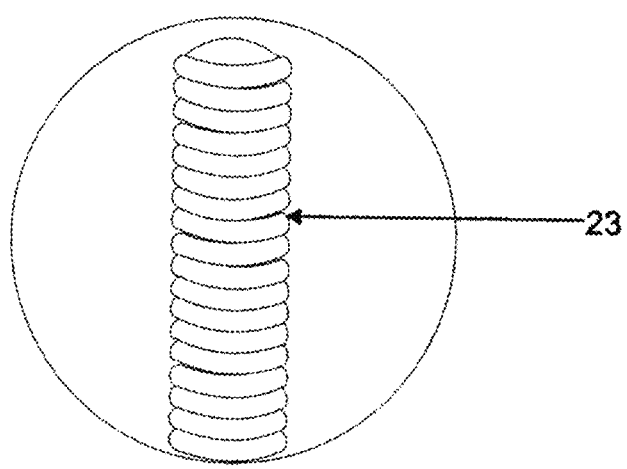
FIG. 3 is a detail of the walls of the contact material.
Figure 4:
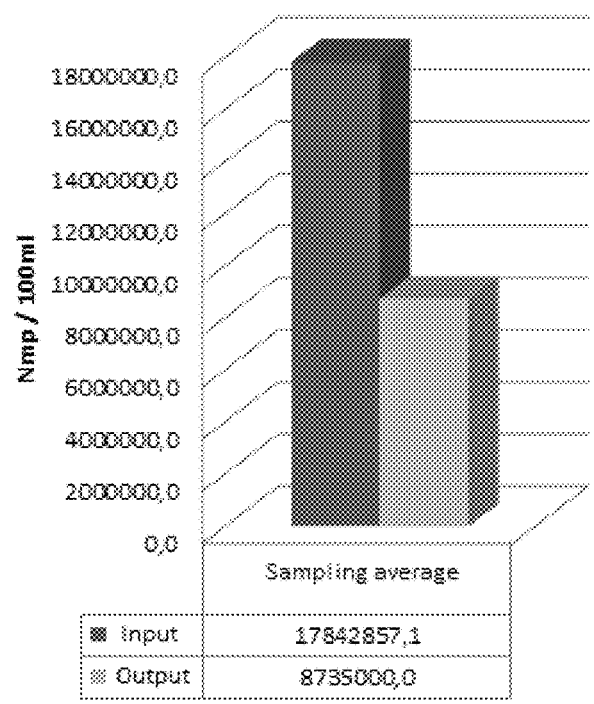
FIG. 4 is a graph of the concentration of fecal coliforms; the right column shows the concentration in the output and the left column shows the concentration in the input. This nomenclature will be used in all subsequent figures.
Figure 5:
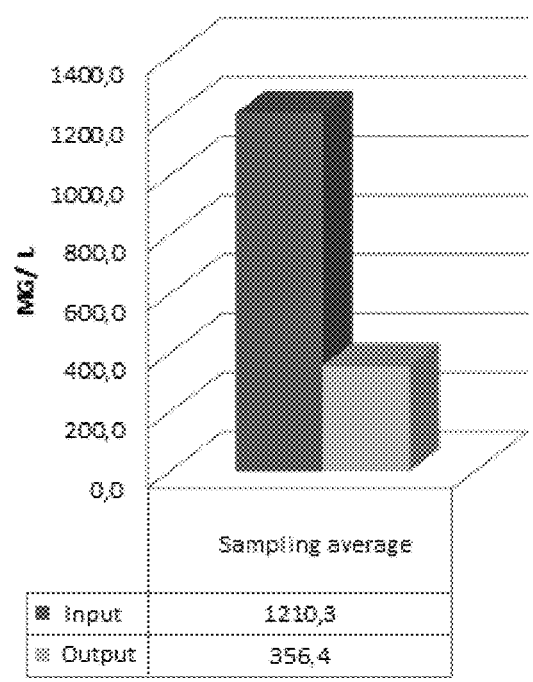
FIG. 5 is a graph of the biochemical demand of oxygen after five days of starting the process.
Figure 6:
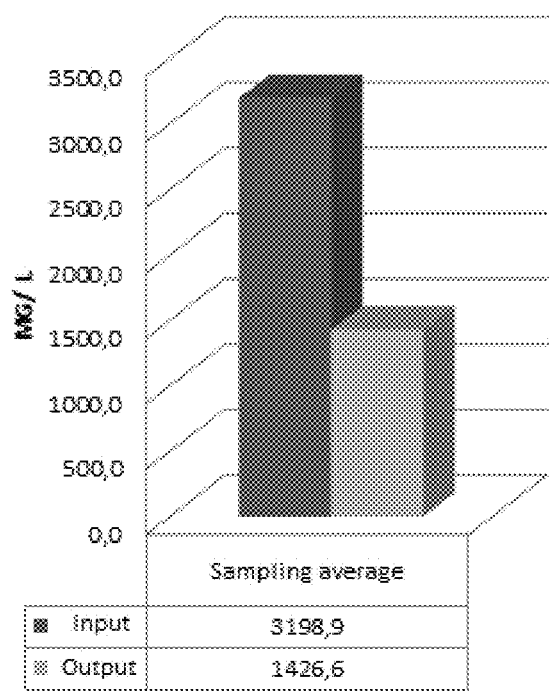
FIG. 6 is a graph of the chemical demand of oxygen during the process.
Figure 7:
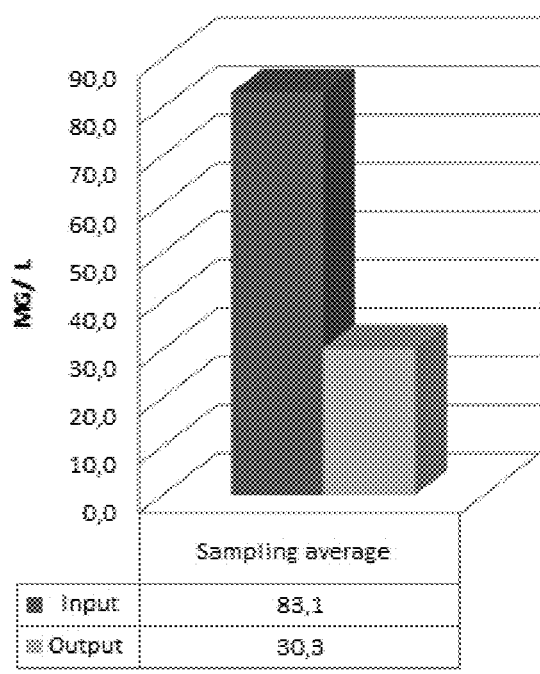
FIG. 7 is a graph which shows the behavior of the process in relation to the concentration of total phosphorus.
Figure 8:
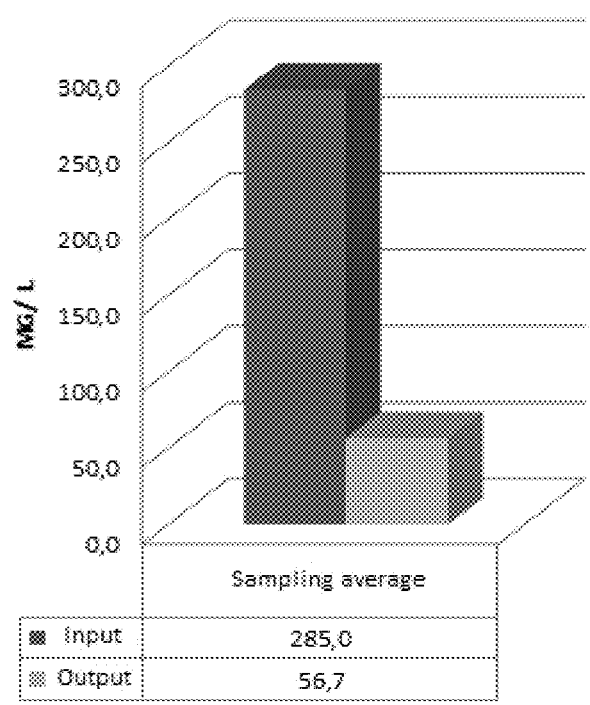
FIG. 8 is a graph which shows the concentrations of grease and oil in the input and output of the process.
Figure 9:
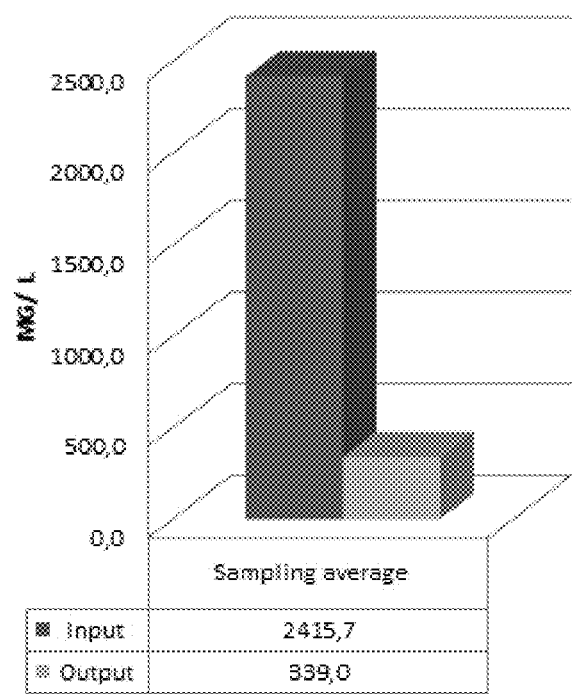
FIG. 9 is a graph of the behavior of total suspended solids.
Figure 10:
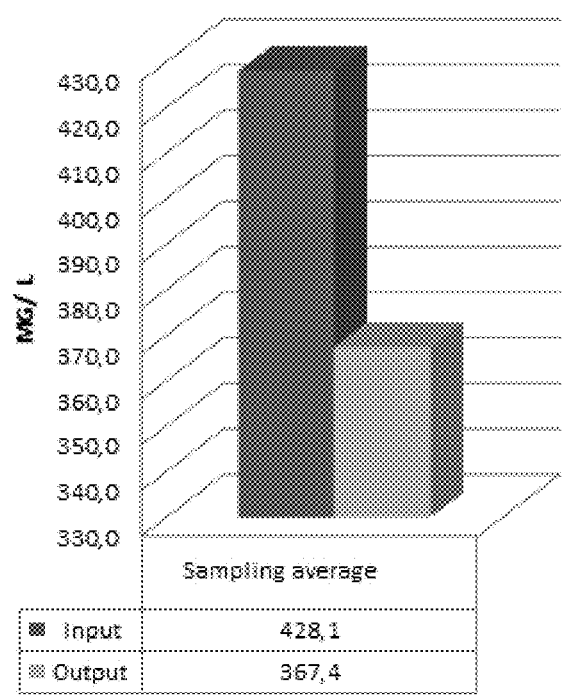
FIG. 10 shows the total concentration of nitrogen in the input and output of the process.
Figure 11:
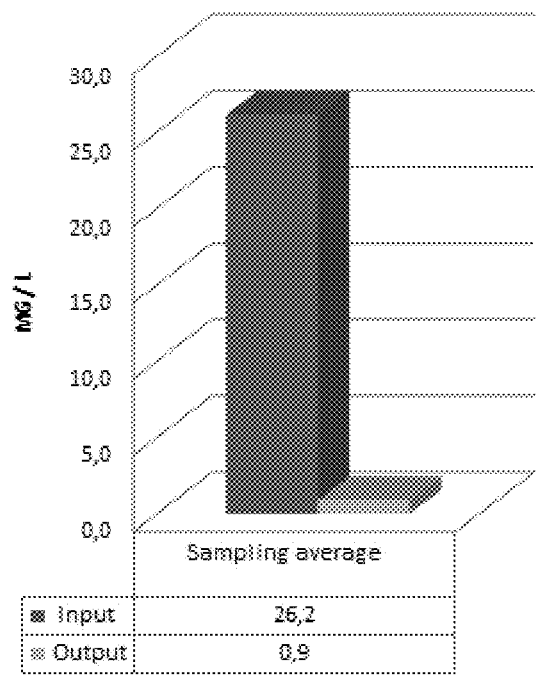
FIG. 11 shows the efficiency of the equipment in reducing the concentration of sedimentable solids.

These data were obtained from a pilot test in which livestock waste water was treated.

DETAILED DESCRIPTION OF THE INVENTION

The bio-filter for the digestion of waste water is a tank (1) with different sections and different geometries. The upper section (2) is vaulted or has the geometry of a frustum, which has projections (3) in several opposing points distributed symmetrically around the tank (1). The purpose of these projections is to increase the mechanical resistance of the tank. Pipes can be attached to a lateral edge but preferably, the projections should be used.

The second section of the tank is a straight cylinder (4), the third section of the tank is an inverted cone (5), truncated in the lower part or vaulted, and has a cylindrical section at the bottom (6).

The bio-filter is fed by means of a horizontal duct (7) which reaches up to the center of the tank (1), crossing an upper inner container (8), which is closed at its base, which in turn is supported at the mouth of the tank (9) where it has a lid (10) which does not touch the pail-shaped or slightly cylindrical tank, the horizontal duct (7) which is located inside the inner tank has a "T" shaped shunt in a horizontal position (11) where the upper arm (12) reaches almost to the lid (10) of the feeding tank (1). When it is necessary, the bio-filter can be fed through the upper part by means of the upper arm (12). The lower arm of the "T" (14) extends downwards to the part of the lower conical section (5) crossing a lower inner container (15) where the feeding discharge is poured.

The lower inner container (15) is a body in the shape of an inverted pail or an inverted frustum. The lower inner container (15) is closed in its upper part where only the duct (14) crosses it to the bottom; the upper and lower openings allow the flow of the liquid to the external part of the lower inner container (15). The feeding duct (14) which discharges the feeding water enters through the upper part to the center of the lower inner tank (15). The lower inner container (15) has a series of openings around the lower part of its wall which are distributed peripherally, through which the sludge is exchanged from inside the lower inner container (15), as the duct (14) feeds water to the lower inner container causing the fracturing and mixing of the sludge.

Once the effluent leaves the lower container (15) through the upper openings of the lower inner tank (15), it comes in contact with the first packed material (17).

The bio-filter has an inclined tube (18) for maintenance purposes which extends from the cylindrical section (6) at the bottom of the tank (1) to its upper part, where it comes out through one of the prism-shaped projections (3), where it must be placed; the inclined tube (18) has a horizontal shunt located at a lower level than the feeding duct (7) and the discharge duct (19) whose diameter is smaller than the diameter of the feeding duct (7). The horizontal shunt (20) passes through the wall of the bio-filter and discharges due to the force exerted by the hydrostatic column inside the tank (1); in the outer end of the horizontal shunt (20) there is a valve (21) to allow the cleaning of the bio-filter or to just serve as a stopper.

The upper inner container (8) has a series of circular openings (22) located along the periphery of its circumference at a lower height than the feeding duct (7) and the duct that discharges treated waste water (19) and the horizontal maintenance shunt (20) in order for skimming to be achieved.

The output duct (19) extends from the wall of the upper inner container (8) and has a smaller diameter than the diameter of the feeding duct (7). The maintenance duct (18) has a valve in its outer end (21) which opens to allow the evacuation of the sludge stored in the lower cylindrical section (6) of the bio-filter; in the ascending inclined projection (18) it has an upper lid (24) through which the sludge can be extracted if necessary.

In the lower conical section (5) the bio-filter is filled first with contact (17) or packing material distributed at random. Above this material the bio-filter has bundles of rough or ringed tubular material which provides a greater contact surface both in the interior wall and in the interior walls of the tubes (23) which are fixed in position. The tubular material (23) is ringed, which thereby creates bundles of hollow corrugated tubes. The bio-filter has air openings (13) to prevent the accumulation of gases which can then be extracted.

Process

The waste water enters the bio-filter through the feeding duct (7) until it reaches the center of the bio-filter where there is a "T" shaped shunt with 2 arms (11), one of which extends to the upper part of the tank which can also be used for feeding in waste water, and a second arm (14) which discharges into the lower inner container (15) through the vertical duct (14); the lower inner container (15) has a series of openings (25) along its upper perimeter where the water to be treated is poured out by the discharge capability of the duct (14). The constant flow of the waste water coming in through the duct helps to break up the solids and get them in contact with the lower inner container (15). The liquid comes out through the openings (25) and rises to reach the contact or packing material (17) which prevents the suspended solids from rising too quickly to the second packed sections which consist of bundles of tubes. While the solids are trapped inside the lower inner container (15) and in the packed section (17), the water free of solids then goes through the second stage of the treatment, passing through the corrugated tubes (23). The liquid rises until it reaches the height of the openings (22) of the upper tank, where it comes in and floods the tank until it reaches the height of the discharge tubing (19), through which the liquid is moved and finally discharged as treated water. Additionally, the water can be given other complementary treatments such as aeration, passing it through ultra violet light or chlorination.

In the lower zone of the lower inner container (15) the openings (16) have the function of sludge exchange. When the influent is discharged into the lower inner container (15) it collides with the sludge causing the bioreaction between the sludge at the bottom, which contain great quantities of microorganisms, and the influent, which contains great amounts of nutrients.

We recommend the use of a decanter prior to the process to avoid stagnation.

The results of a pilot test with livestock waste water which show the performance of the bio-filter are listed below:

| Analysis of the bio-filter | Unit | Input Average | Output average | Reduction (%) |
| --- | --- | --- | --- | --- |
| Fecal coliforms | NMP/100 ml | 17842857.1 | 8735000 | 52 |
| BDO | mg/l | 1210.3 | 356.4 | 71 |
| QDO | mg/l | 3198.9 | 1426.6 | 55 |
| Total phosphorus | mg/l | 83.1 | 30.3 | 64 |
| Fat and oil | mg/l | 285 | 56.7 | 80 |
| Total nitrogen | mg/l | 428.1 | 367.4 | 14 |
| Total suspended solids | mg/l | 2415.7 | 339 | 86 |
| Settable solids | mg/l | 26.2 | 0.9 | 97 |

The above results show the capacity of the bio-filter.

I consider the anaerobic bio-filter and the content of the following claims to be my property:

The invention claimed is:

1. A bio-filter for the digestion of waste water which comprises a tank with an upper first section which is vaulted or shaped like a frustum and delimited by a mouth, wherein the mouth is closed by a lid; a second intermediate section which is a right cylinder; and a third section in the lower part of the tank, wherein the lower part is shaped as an inverted cone and which also has a cylindrical section at the bottom; the bio-filter also has a horizontal feeding duct which reaches towards the upper first section of the tank to the center of the tank passing through an inner upper container with the shape of an inverted bucket closed on its upper and lower faces, with openings placed along the perimeter at a height lower than the feeding duct, which give the treated water access into the inner upper container; the bio-filter also includes a discharge duct whose diameter is smaller than the diameter of the feeding duct, and which is placed at a lower height than that of the feeding duct, the discharge duct is connected to the inner upper container, so the treated water collected by the inner upper container can be discharged through the discharge duct; the feeding duct in turn has a "T" shaped shunt in a horizontal position, the shunt having an upper arm and a lower arm, wherein the upper arm of the "T" extends to the lid of the tank and the lower arm of the "T" extends downwards to the third section of the tank having a lower conical section, the lower arm also going through a lower inner container where the feeding discharge is poured, the lower inner container is an object with the shape of an inverted bucket or inverted frustum, wherein the upper part of the lower inner container is closed, allowing only the lower arm of the "T" to pass, wherein the lower inner container has upper openings along the perimeter of its upper wall to allow water to exit as well as lower openings along the perimeter of the lower part of its wall so that entering water touches and then breaks up sludge at the bottom of the lower inner container, wherein the lower openings allow the exchange of sludge to the outer part of the lower inner container, causing fragmentation and bio-feeding of the sludge; wherein the bio-filter has two packing bed sections: a lower section with the packing bed distributed at random and an upper section formed by tubular bundles with corrugated surfaces; and wherein the bio-filter also has a gas exit situated in the upper first section of the tank.

2. The bio-filter of claim 1, wherein the No-filter has a self-cleaning system consisting of a maintenance duct which is an inclined duct that reaches from the upper first section of the tank to the lower cylindrical section, the maintenance duct has a horizontal shunt which is below the level of both the feeding duct and the discharge duct, the diameter of the horizontal shunt is smaller than the diameter of the feeding duct, the maintenance duct transports the sludge from the bottom of the bio-filter, expelling it through the horizontal shunt which has a valve or a stopper in its outer extreme.

3. The bio-filter of claim 1, wherein the inner upper container is fixed to the mouth of the tank.

4. The bio-filter of claim 1, wherein the upper first section of the tank has projections shaped like right triangular prisms in opposing points and distributed symmetrically around the tank, one acute angle of these projections protrudes from the center of the tank, the hypotenuse joins the vaulted or frustum-shaped upper first section of the tank.

5. The bio-filter of claim 1, wherein the discharge duct is placed in a position opposite to that of the feeding duct.

* * * * *